United States Patent [19]

Roeschlein

[11] 3,833,856
[45] Sept. 3, 1974

[54] APPARATUS FOR TESTING AN AMPLIFIER
[75] Inventor: Eugene R. Roeschlein, Indianapolis, Ind.
[73] Assignee: The United States of America as represented by the Secretary of the Navy, Washington, D.C.
[22] Filed: Nov. 15, 1973
[21] Appl. No.: 416,331

[52] U.S. Cl................. 330/2, 324/83 D, 235/151.3
[51] Int. Cl............................................. G01r 25/00
[58] Field of Search...................... 330/2; 324/83 D; 235/151.3

[56] References Cited
UNITED STATES PATENTS
3,560,851  2/1971  Gaines et al...................... 324/83 D
3,622,879  11/1971  Girouy............................. 324/83 D
3,699,434  10/1972  Palmer.............................. 330/2 X Primary Examiner—John S. Heyman
Attorney, Agent, or Firm—R. S. Sciascia; Paul S. Collignon

[57] ABSTRACT

A testing device for measuring phase shift and amplitude changes in an amplifier. A frequency synthesizer provides a sine wave through first and second channels with the amplifier being connected in the first channel. The outputs from the first and second channels are applied to a computer for analysis. The computer is programmed to calculate the phase angles for the waveforms. The difference in these phase angles is the phase shift of the amplifier under test, and this difference is presented in a readout device.

5 Claims, 1 Drawing Figure

3,883,856
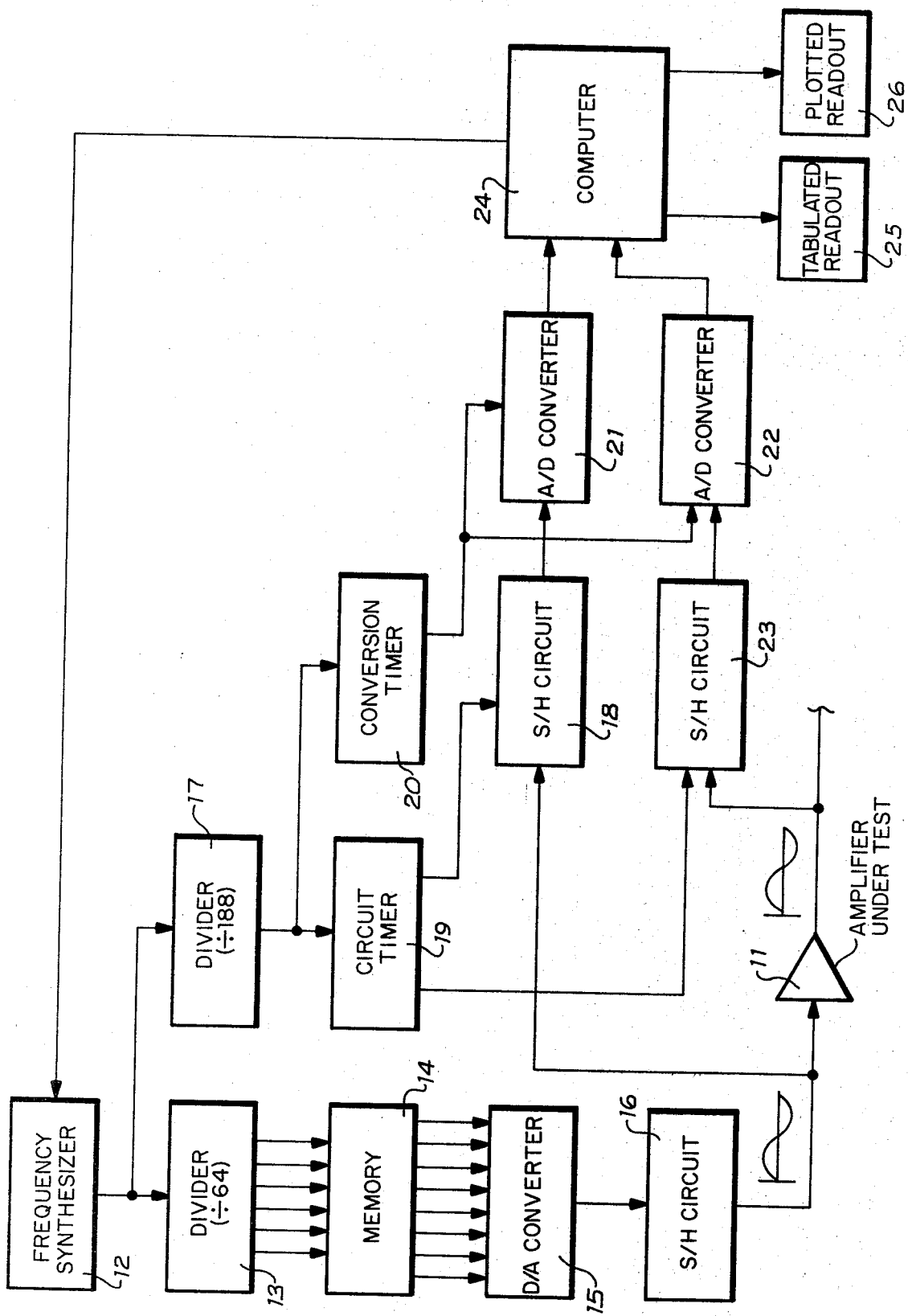

APPARATUS FOR TESTING AN AMPLIFIER

BACKGROUND OF THE INVENTION

The present invention relates to a measuring and testing device and more particularly to a device for measuring the phase shifts and amplitude changes through an amplifier.

One commonly employed system of measuring phase shift through an amplifier uses an adjustable oscillator as a signal source to the amplifier and time delay through the amplifier is measured either electronically or by an adjustable delay circuit which is adjusted and nulled with the output of the amplifier under test.

One device for testing an amplifier is shown and described in U.S. Pat. No. 3,311,714, entitled, "Method And Apparatus For Testing A Repeatered Transmission Path," which issued Mar. 28, 1967, to Louis Howson. In this patented device, a signal source is connected to a transmission path having a repeating amplifier therein and an oscillator, which generates a sinusoidal tone, is connected through a bandpass filter and resistance to the output of the repeating amplifier. A loss adjusting network and phase adjusting network are provided between the oscillator and the input of the repeating amplifier and these networks are adjusted until a null is created at the amplifier output.

Heretofore available test methods for measuring phase shift were limited in accuracy by the accuracy of the circuits or by the accuracy of the standard components used for reference. This accuracy was usually on the order of one degree and with careful design and calibration might be brought down to one-tenth of 1°.

SUMMARY OF THE INVENTION

The present invention relates to a circuit for accurately measuring the phase shifts through an amplifier. A sine wave is passed through the amplifier under test and also passed simultaneously to a sampling analog to digital converter. A fast fourier transform computer program is used to convert the time samples to the frequency domain for both the input and output waveforms of the amplifier under test and it is possible to calculate the phase angle of the fundamental for both the input and the output. The difference in these phase shift angles is the phase shift of the amplifier under test.

It is therefore a general object of the present invention to provide a highly accurate device for measuring phase shifts through an amplifier.

Other objects, advantages and novel features of the invention will become apparent from the following detailed description of the invention when considered in conjunction with the accompanying drawing.

BRIEF DESCRIPTION OF THE DRAWING

The FIGURE of the drawing is a block diagram of a preferred embodiment of the present invention.

DESCRIPTION OF THE PREFERRED EMBODIMENT

Referring now to the drawing, there is shown an amplifier 11 under test which is to be measured for phase shift. A frequency synthesizer 12 is used to derive a sine wave, with the output signal from frequency synthesizer being used to clock a countdown circuit, divider 13, which divides the frequency by 64.

Frequency synthesizers are well-known in the art and one such device is shown and described in U.S. Pat. No. 3,671,871, entitled, "Signal Frequency Synthesizer," which issued June 20, 1972, to Robert E. Malm. A commercially available frequency synthesizer is manufactured by Rockland Systems Corporation, West Nyack, N. Y., and Model 5100 has a frequency range of 0.001 HZ to 2 MHZ, with a frequency resolution of 0.001 HZ throughout the entire range. By way of example, the countdown circuit might be comprised of six flip-flops, with each stage having an output, and these six outputs are the binary representation of numbers 0 to 63.

The six outputs from divider 13 are applied to a read only memory 14 to address its contents. Memory 14 stores 64 8-bit digital words representing a sine function of one cycle. The sine function is (1 + sine N), and its values range from 00000000 to 11111111 and, accordingly, has 64 values of this sine function and 8 output bits. This digital representation is passed to a digital to analog converter 15. The output from digital to analog converter 15 is applied to a sample and hold circuit 16 in order to hold the output constant during transitions.

A second divider 17 is provided to generate a sample pulse for sample and hold circuit 18 and analog to digital converters 21 and 22. The countdown for the sample frequency is set at 188 and, as the countdown for the sine wave generator is set at 64, a sample point of slightly less than a multiple of cycles is provided and thus causes precession of the sample point. A circuit timer 19 is used for providing timing functions for sample and hold circuits 18 and 23, and a second timer 20 provides timing functions for analog to digital converters 21 and 22. As shown in the drawing, the output from sample and hold circuit 16 is applied to computer 24 through sample and hold circuit 18 and analog to digital converter 21, and the output from amplifier 11 is applied to computer 24 through sample and hold circuit 23 and analog to digital converter 22.

Computer 24 is programmed to provide for the operation of the circuit. By way of example, computer 24 might be a Nova 800 series computer manufactured by Data General Corporation, Southboro, Mass. Computer 24 sets frequency synthesizer 12 for the desired frequency, and collects the desired number of samples from converters 21 and 22. The digital rerpresentations from converters 21 and 22 are stored representations computer 24 which provides a fast fourier transform program to convert the time samples to the frequency domain. Computer 24 computes the phase angle of the fundamental from both channels, that is, the outputs from converters 21 and 22, and then takes the difference between the computed phase angles. This difference is the phase shift for amplifier 11. This phase shift is an absolute phase shift of amplifier 11 and it can be used as an individual measurement or averaged with others for greater accuracy. The frequency setting for frequency synthesizer can be changed and the operation repeated. As shown in the drawing, two read-out devices 25 and 26 are connected to the output of computer 24, with device 25 providing a print-out table of frequency and angle and device 26 being a plotter which provides a plot table of frequency and angle. Printers and plotters are both well-known in the art and can be purchased commercially.

OPERATION

In operation, computer 24 sets a desired frequency in frequency synthesizer 12 and the output from synthesizer 12 is used to clock a countdown circuit, dividing the frequency by 64. The outputs from divider 13 are applied to memory 14 to address its contents, and memory 14 stores 64 8-bit digital words representing a sine function of one cycle. This digital representation is passed to digital to analog converter 15 which forms a sine wave from the information in memory 14 and this sine wave is applied as the input to amplifier 11 being tested. Another countdown circuit is provided to generate the sample pulse for sample and hold circuits 18 and 23, and the analog to digital converters 21 and 22. The input to amplifier 11 is stored in computer 24 through one channel comprised of sample and hold circuit 18 and analog to digital converter 21, and the output from amplifier 11 is stored in computer 24 through a second channel comprises of sample and hold circuit 23 and analog to digital converter 22. The stored information in computer 24 is processed for both channels to provide phase angles and the difference between these phase angles is the phase shift of amplifier 11.

It can thus be seen that the present invention provides an improved testing device for measuring with high accuracy the phase shift through an amplifier.

Obviously many modifications and variations of the present invention are possible in the light of the above teachings. It is therefore to be understood that within the scope of the appended claims the invention may be practiced otherwise than as specifically described.

I claim:

1. A device for measuring phase shift of an amplifier comprising, a frequency synthesizer selectively providing an output signal at any one of a plurality of frequencies, a countdown circuit connected to said frequency synthesizer for dividing the selected frequency and providing a plurality of outputs, memory means addressed by the outputs of said countdown circuit for providing digital word outputs representing a sine function of one cycle, converter means connected to the outputs of said memory means for providing a sine wave to an input of said amplifier, first and second analog to digital converters, a first circuit path connected between said input of said amplifier and said first analog to digital converter and a second circuit path connected between the output of said amplifier and said second analog to digital converter, and computing means connected to the outputs of said first and second analog to digital converters for calculating the phase angle of the sine wave passing through said first circuit path and the phase angle of the sine wave passing through said second circuit path and for taking the difference between the two phase angles to determine the phase shift of said amplifier.

2. A device for measuring phase shift of an amplifier as set forth in claim 1 wherein said computing means selects the frequency of said output signal of said frequency synthesizer.

3. A device for measuring phase syqft shift an amplifier as set forth in claim 1 having a second countdown circuit connected to said frequency synthesizer for generating a sample pulse for said first and second analog to digital converters.

4. A device for measuring phase shift of an amplifier as set forth in claim 1 having readout means connected to said computing means.

5. A device for measuring phase shift of an amplifier as set forth in claim 3 wherein said first and second countdown circuits are dividers having a ratio slightly less than a whole number thereby causing precession of said sample pulse.

* * * * *

UNITED STATES PATENT OFFICE
CERTIFICATE OF CORRECTION

PO-1050
(5/69)

Patent No. 3,833,856      Dated 3 September 1974

Inventor(s) EUGENE R. ROESCHLEIN

It is certified that error appears in the above-identified patent and that said Letters Patent are hereby corrected as shown below:

Column 2, line 49 delete "representations" and after "stored" insert -- in --

Column 3, line 20 change "comprises" to -- comprised --

Column 4, line 5, Claim 1 change "outputs" to -- output --

Column 4, line 27, Claim 3, delete "syqft"

Signed and sealed this 3rd day of December 1974.

(SEAL)
Attest:

McCOY M. GIBSON JR.
Attesting Officer

C. MARSHALL DANN
Commissioner of Patents